United States Patent [19]
Dunnet

[11] 3,905,399
[45] Sept. 16, 1975

[54] LIQUID-CONVEYING HOSE
[75] Inventor: George Dunnet, Edinburgh, Scotland
[73] Assignee: Uniroyal Limited, Midlothian, Scotland
[22] Filed: Dec. 21, 1973
[21] Appl. No.: 427,385

[30] Foreign Application Priority Data
Jan. 2, 1973 United Kingdom............... 194/73

[52] U.S. Cl................................ 138/129; 138/177
[51] Int. Cl.² ........................................ F16L 11/08
[58] Field of Search.............. 138/118, 129–134, 138/172, 177; 57/144, 145, 160, 161

[56] References Cited
UNITED STATES PATENTS
2,747,616  5/1956  Ganabl............................... 138/130
2,825,364  3/1958  Cullen et al. .................. 138/129 X
2,969,812  1/1961  Ganabl............................ 138/130 X
3,548,884  12/1970 Ambrose.......................... 138/129 X
3,598,126  8/1971  Hoeltzenbein.................. 138/118 X
3,604,461  9/1971  Matthews........................ 138/130 X Primary Examiner—John W. Huckert
Assistant Examiner—Charles Gorenstein
Attorney, Agent, or Firm—Charles A. Blank, Esq.

[57] ABSTRACT

A liquid-conveying hose having reinforcing bands of cord reinforcing material extending around the hose body at an angle to the axis of the hose body, the angle being lower at one end of the hose than the other to cause the hose to have variable flexibility along its length.

6 Claims, 1 Drawing Figure

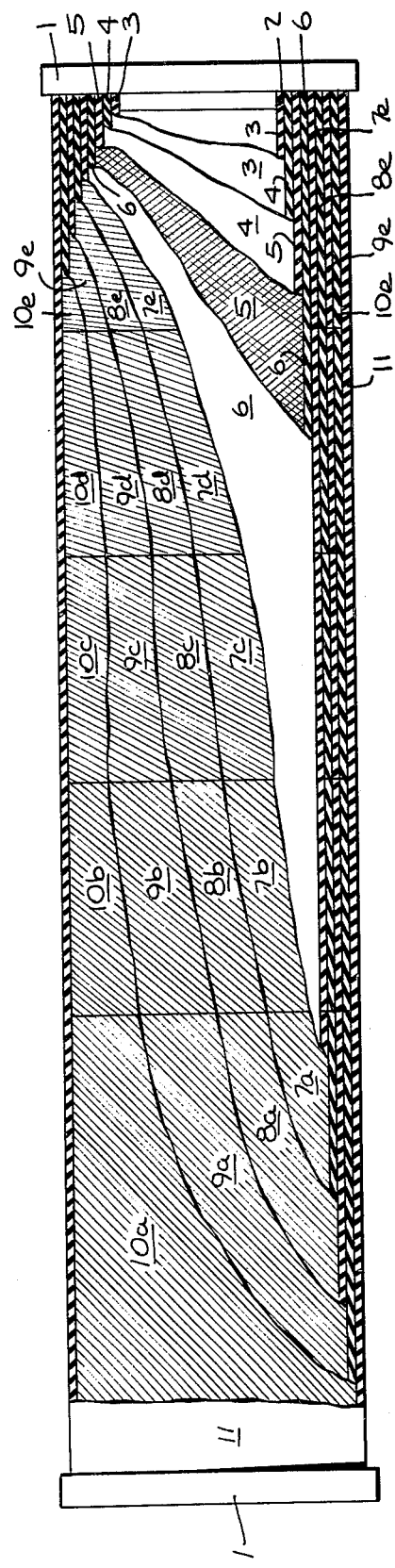

LIQUID-CONVEYING HOSE

This invention relates to liquid-conveying hose and, more particularly, to oil suction and discharge hose.

It has become conventional for oil tankers to be moored off-shore to a buoy having two relatively rotatable sections, one section secured to the sea bed, and the other section providing an anchorage point for the mooring line and for the oil hose which will be connected to the ship. A buoy construction of this sort allows a moored tanker to swing freely under the influence of tide and wind without oil flow through the hose to or from the tanker being interrupted. However, it is known that the two relatively rotatable sections of such a buoy may become jammed. When this occurs, a moored tanker will, of course, continue to swing freely due to the flexibility of the mooring line, but the hose will not be free to follow this movement without flexing near its point of anchorage to the buoy. The degree of flexure applied to the hose can easily be sufficient to cause the hose to rupture with consequent oil loss.

It has been proposed to make oil suction and discharge hose substantially rigid at one end thereof and relatively flexible at the other end thereof, for use as the end section of a multi-section hose extending between the buoy and the tanker, and the more rigid end is coupled to the buoy. As the greatest flexing strain is applied to the hose near the buoy, if the buoy does jam, it will be seen that such hose is better equipped than hose of uniform flexibility to resist this load, due to its greater strength. Furthermore, the increasing flexibility will cause any bending load on the hose to be spread along the hose from the substantially rigid end secured to the buoy, and allows a high degree of movement of the more flexible end relative to the less flexible end without rupture of the hose occurring.

It is an object of the present invention, therefore, to provide a new and improved liquid-conveying hose which avoids one or more of the disadvantages of prior such hose.

It is another object of the invention to provide a new and improved hose having variable flexibility along the length of the hose.

It is another object of the invention to provide a new and improved hose which is stiffest at one end thereof and gradually becomes more flexible, over the remainder of the hose.

In accordance with the invention, liquid-conveying hose comprises a hose body having a reinforcing band comprising a ply of cord reinforcing material having cords extending around the hose body at an angle to the axis of the hose body, the angle being lower at one end of the hose than at the other.

This variation in cord angle leads to a variation in hose flexibility. The smaller the angle between the cord and the hose axis, the lower is the flexibility of the hose.

Preferably each ply is of a weftless cord reinforcing fabric skim coated with elastomeric material, and the fabric is applied to the hose in axial bands extending along the length of the hose, each of the bands comprising a ply of cord reinforcing material having cords extending around the hose body at an acute angle to the axis of the hose body, the acute cord angle in successive bands along the length of the hose increasing from one end of the hose to the other. As used herein, the term "cord" is intended to include thread, filament, yarn and the like.

The cord reinforcing material is preferably an inextensible cord having high stiffness and high tensile modulus. An example of such a cord is a monofilament polyester such as that sold by I.C.I. Fibres Limited under the name of Macrofil. The tensile modulus should be at least 50 grams per denier and preferably more than 90 grams per denier. The tensile modulus of Macrofil is 93 grams per denier. The high stiffness of the cord is indicated by the Young's modulus of the material and is preferably at least $1200 \times 10^8$ dynes/cm$^2$. The Young's modulus for Macrofil is $2000 \times 10^8$ dynes/cm$^2$.

Conveniently all the plies of cord reinforcing material have the cords extending in the same direction. However, it is possible to apply alternate plies with the cords crossing, in which case the overall stiffness of the hose will be increased.

For a better understanding of the present invention, together with other and further objects thereof, reference is made to the following description, taken in connection with the accompanying drawing, and its scope will be pointed out in the appended claims.

Referring now to the drawing:

The FIGURE is a partially cut-away and partially sectioned view taken longitudinally of a hose constructed in accordance with the invention.

The hose is built up on a mandrel (not shown) between two end nipples in substantially conventional manner. In this particular example the hose is of 8 inch inner diameter and is 30 feet long, but it will, of course, be apparent that the principles of the invention can be applied to hose of other dimensions. The nipples preferably are first prepared in conventional manner by sandblasting and applying a layer of neoprene rubber to the inner part 2 thereof. The two nipples are then set up at either end of the mandrel with the required spacing between them, and are clamped to the mandrel. An inner body layer is preferably then built on to the mandrel, using conventional methods, in a number of stages entailing the application to the mandrel of a lining 3 of nitrile rubber, a breaker layer 4 of leno weave textile material coated with nitrile rubber, a burst reinforcement layer 5 comprising four plies of weftless terylene cord fabric coated with styrene-butadiene rubber, alternate plies being wound on to the hose in alternate directions and the cords in each ply making an angle of about 52° to the hose axis, and a layer 6 of hard rubber. The hard rubber may be a blend of styrene-butadiene rubbers with clay and carbon black fillers, the fillers being present in about 120 parts of rubber by weight, the cured rubber having a Shore A hardness in excess of 80.

The material giving the variable flexibility is then applied around the hose. Four plies of reinforcing material preferably comprising weftless "Macrofil" cord skim coated with styrene-butadiene rubber are applied to the hose. All four plies preferably are applied with the cords extending in the same direction, and each ply is made up of five axial sections indicated by the ply reference numerals 7 to 10 respectively with suffices a to e. Axial sections 7a to 10a have an axial length of, for example, 10 feet and the cord angle in each section is for example, 45° to the hose axis. All other axial sections have an axial length of, for example, 5 feet. The cord angle in sections 7b to 10b is, for example, 55°; in sections 7c to 10c is, for example, 65°; in sections 7d to 10d is, for example 75° and in sections 7e to 10e is for example, 85°.

The cord reinforcing materials preferably are covered by a cover layer 11 of styrene-butadiene rubber.

After assembly as described the hose may be wrapped and cured in conventional manner. It is found that the cured hose is stiffest at the end with axial sections 7a to 10a, and becomes more flexible in stages towards the end with axial sections 7e to 10e.

The angles given in the foregoing description are purely exemplary and different angles may be used. The hose may be made even stiffer at one end by using ply angles of less than 45°, and the variation of angle between adjacent plies may be made more or less gradual. Overall stiffness could be increased by applying alternate ones of plies 7a–7e, inclusive, to 10a–10e, inclusive with the cords in any one layer crossing those in adjacent layers. The construction of the body of the hose can be varied as desired. Thus, the burst reinforcement layer 5 may be of wire cord or a textile material other than terylene. The body may be of a construction that includes reinforcing body wire spiralled uniformly along the hose, in which case the reinforcing layers 7a–7e, inclusive, to 10a–10e, inclusive, will be applied radially externally of the body wire. The layer 6 of hard rubber need not be of uniform thickness, and may become thinner, either gradually or in stages, from the stiffer to the more flexible end of the hose, so increasing the difference in the flexibility. Alternatively, the layer 6 may be composed of axially alternate bands of hard rubber and soft rubber. The ratio of width of the soft rubber bands to the hard rubber bands may then increase towards the more flexible end of the hose, thereby enhancing the difference in flexibility.

Hose according to the invention can, if desired, be rendered buoyant when full of water by any one of a number of methods. Thus, the hose may be fitted, after manufacture, with floats such as those described in U.K. Pat. No. 1,277,364. Alternatively buoyancy material may actually be built into the body of the hose. In one such construction the reinforcing ply 10a–10e is covered by a first layer of buoyancy material, which is in turn covered by a second layer of buoyancy material over which is applied the cover layer 11. The compression modulus of the first layer may be greater than that of the second layer, as described in co-pending application U.S. Ser. No. 314,900, filed Dec. 13, 1972 by Clive S. Thawley and assigned to the assignee of this application. In another embodiment the reinforcing ply 10a–10e is covered by a buoyancy material over which is applied the cover layer 11, and the buoyancy material in the regions of the ends of the hose has a greater compression modulus and less flexibility than the buoyancy material around the central section of the hose, as described in co-pending U.S. Ser. No. 407,742 filed Oct. 18, 1973 by Clive S. Thawley and assigned to the assignee of this application. Other methods of incorporating buoyancy material in the hose body, or of applying buoyancy material to the finished hose, may be used. The buoyancy material may be applied to the full length of the hose, or only to part of the length of the hose, commencing at the more flexible end of the hose.

While there has been described what is at present considered to be the preferred embodiment of the invention, it will be obvious to those skilled in the art that various changes and modifications may be made therein without departing from the invention, and it is, therefore, aimed to cover all such changes and modifications as fall within the true spirit and scope of the invention.

I claim:

1. Liquid-conveying hose comprising a hose body having at least one reinforcing band comprising a ply of cord reinforcing material having cords extending around said hose body at an angle to the axis of said hose body, said angle being lower at one end of the hose than at the other.

2. A hose in accordance with claim 1 in which said ply is of weftless cord reinforcing fabric skim coated with elastomeric material.

3. A hose in accordance with claim 1 which includes a plurality of reinforcing bands applied to the hose in axial bands extending along the length of the hose, each of said reinforcing bands comprising a ply of cord reinforcing material having cords extending around said hose body at an acute angle to said axis of said hose body, said acute angle of said cords in successive axial bands along the length of the hose increasing from one end of the hose to the other.

4. A hose in accordance with claim 1 in which said cords are relatively inextensible and have high stiffness and high tensile modulus.

5. A hose in accordance with claim 3 in which said acute angle in 45° at one end of the hose.

6. A hose in accordance with claim 1 in which each band comprises four plies of cord reinforcing material with the cords of individual bands extending in the same direction.

* * * * *

UNITED STATES PATENT AND TRADEMARK OFFICE
CERTIFICATE OF CORRECTION

PATENT NO. : 3,905,399
DATED : September 16, 1975
INVENTOR(S) : George Dunnet

It is certified that error appears in the above-identified patent and that said Letters Patent are hereby corrected as shown below:

Column 4, line 45 for "in" read --is--.

Signed and Sealed this sixteenth Day of March 1976

[SEAL]

Attest:

RUTH C. MASON
*Attesting Officer*

C. MARSHALL DANN
*Commissioner of Patents and Trademarks*